HENRY JOHN CAULFIELD
INVENTOR

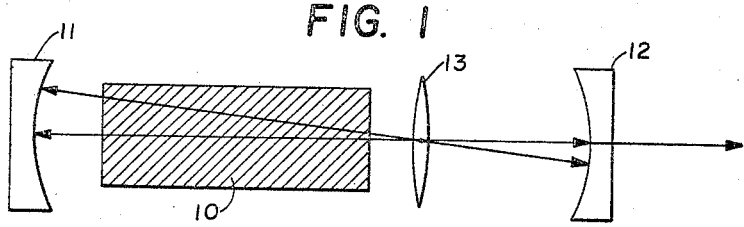
FIG. 1
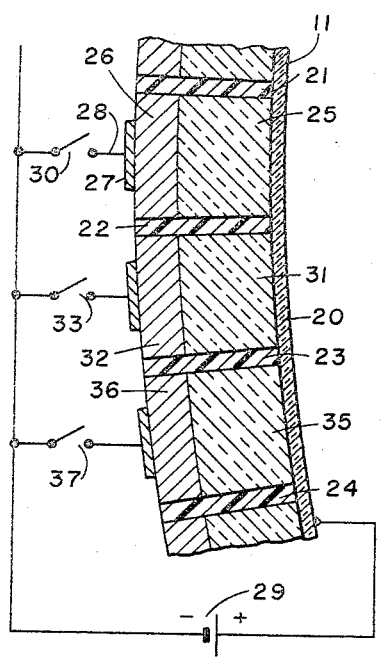
FIG. 2
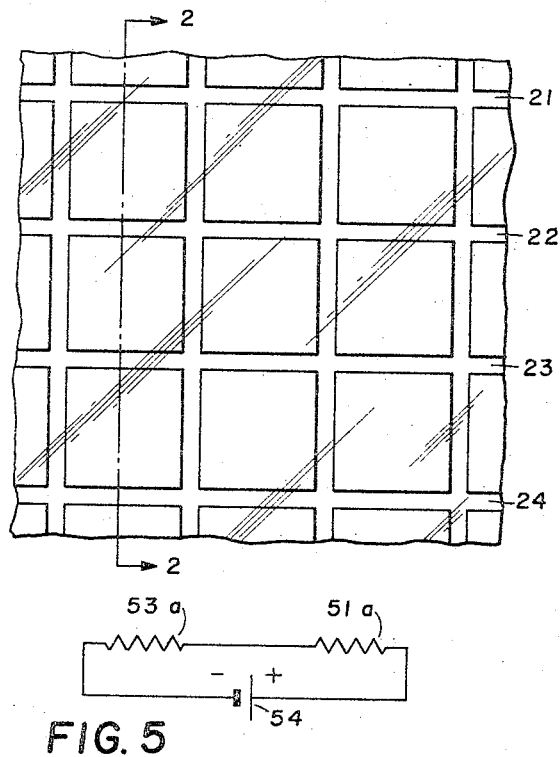
FIG. 3
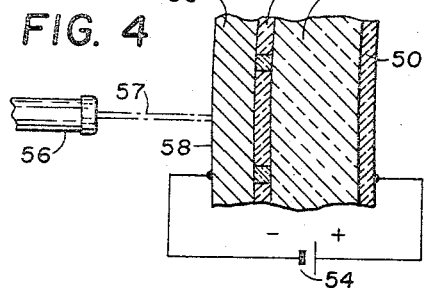
FIG. 4
FIG. 5
HENRY JOHN CAULFIELD
INVENTOR

ATTORNEY

United States Patent Office 3,427,456
Patented Feb. 11, 1969

3,427,456
LASER IMAGES FORMED BY MATRIC CONTROL
Henry John Caulfield, Richardson, Tex., assignor to Texas Instruments Incorporated, Dallas, Tex., a corporation of Delaware
Filed Feb. 24, 1966, Ser. No. 529,768
U.S. Cl. 250—199                    4 Claims
Int. Cl. H04b *9/00;* H01s *3/08;* G02f *1/36*

ABSTRACT OF THE DISCLOSURE

Disclosed is a multi-mode laser having within the laser cavity an electro-optic, controllable, confining mirror comprising a plurality of cells of variable reflectivity, each cell controlled by a semiconductor diode which, in response to a voltage applied to it causes a current to flow in the electro-optic material to affect the lasing mode, so that active images are formed in the laser beam corresponding to the voltages applied to the diodes.

---

This invention relates to the control of lasers for formation of active images in the laser beam, and more particularly in a laser having in and as a part of the laser cavity an electro-optic, controllable, confining mirror system.

In the operation of lasers, it has been found that above a given gain threshold, many modes appear. In some instances, effort has been made to suppress all but one mode so that the efficiency of the laser would be optimized in only one mode. The present invention is directed to forming of active images through the use of lasers. One approach to this objective has been described in Active Image Formation in Lasers by W. A Hardy, IBM Journal, 1965. The present invention is directed to the control of a laser operating in multiple modes by means of a matrix which introduces perturbations in selected modes only.

Heretofore, it has been found that a laser may be caused to oscillate in a multi-mode manner by using confining mirrors and that the operation may be perturbed by the introduction of objects or masks into the cavity at the mirror surface to locally destroy the mirror reflectivity. As a result, the field distribution in laser oscillation can be projected from a laser cavity and refocused by conventional optical elements to form images of the objects.

The present invention is directed to an axial (transverse) mode selection in a multi-mode laser and in a more specific sense to a laser system which includes a mode selecting matrix of electro-optic elements in the laser cavity.

In accordance with this invention, a multiple mode laser is provided with confining mirrors, one of which is partially transmissive and the other of which includes optically active means between the laser and the reflector surface, with means for selectively modifying the character of spaced portions of the optically active means in accordance with information signals for producing a laser output beam which corresponds with the information signals.

In a more specific aspect, one of the confining mirrors, which is employed to make a plurality of laser modes equally probable and equally populated, is formed as a unitary matrix structure having reflector elements adjacent to optically active elements each adapted to be controlled to alter the local reflectivity of the confining mirrors in accordance with information signals.

Figure 7:
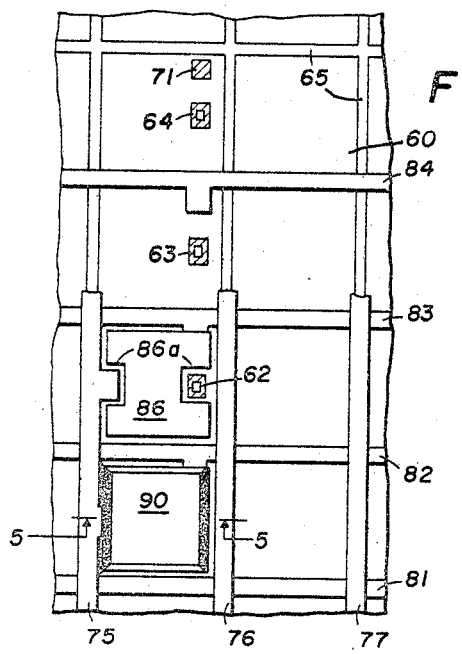
Figure 6:
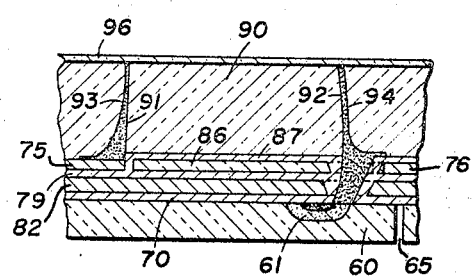
Figure 8:
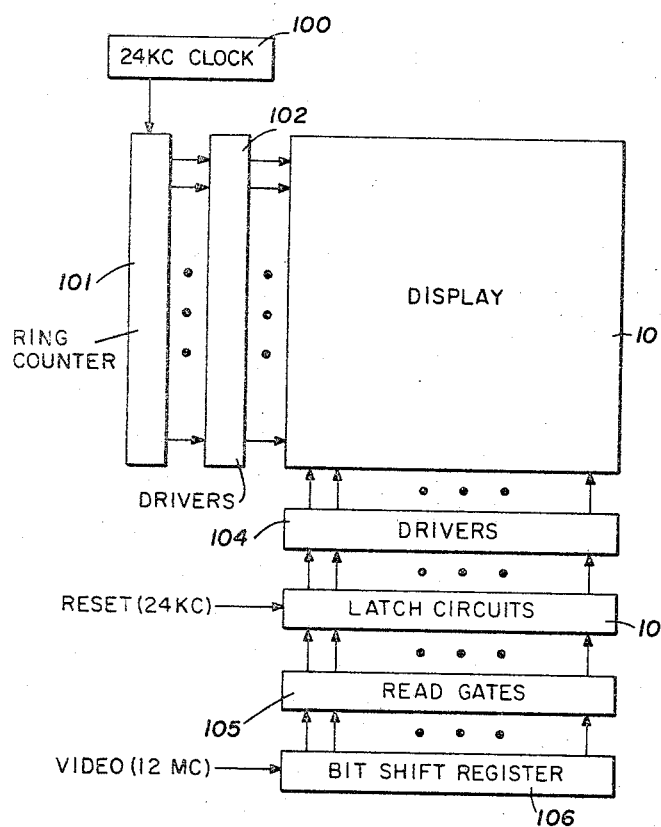

For a more complete understanding of the present invention and for further objects and advantages thereof, reference may now be had to the following description taken in conjunction with the accompanying drawings in which:

FIGURE 1 schematically illustrates a multi-mode laser;
FIGURE 2 is an enlarged sectional view of a portion of one of the confining mirrors of FIGURE 1 taken along line 2—2 of FIGURE 3;
FIGURE 3 is a view of a portion of the face of the mirror of FIGURE 2;
FIGURE 4 illustrates a modification in which photoelectric control is employed for the confining mirrors;
FIGURE 5 illustrates the electrical equivalent for control of FIGURE 4;
FIGURE 6 is a sectional view of another embodiment of a suitable control matrix;
FIGURE 7 is a view of a portion of the face of the unit of FIGURE 6;
FIGURE 8 illustrates control of the system of FIGURES 6 and 7.

Lasers can be generally classified in one of two classes: (1) a multiple beam laser and (2) multiple mode laser.

Multiple mode lasers heretofore have involved the use of lenses and mirrors to spread the laser beam. Light produced in each of the transverse modes is directed by the lens system as to impinge the mirrors normally, thus eliminating any viewing angle problem and assuring multi-mode operation.

In accordance with this invention, provision is made for selectively controlling any given portion (mode) of the laser output. This is accomplished by forming a matrix in the laser cavity on the face of the confining mirror opposite the output of the laser system.

The matrix need not provide high contrast, but merely needs to introduce some perturbation in the absorption characteristic of the mirror thereby to prevent a given mode from lasing. By this means, elements in the matrix, selectively energized in accordance with information signals, will translate the laser beam into a pattern of varying light intensity.

In accordance with the invention, the basic optical cavity employed herein may be as represented in FIGURE 1. The active medium 10 is positioned between mirrors 11 and 12. The mirrors 11 and 12 are located at the objective and image positions for a lens 13. Mirror 11 is an optically active controllable matrix.

A section of the mirror 11 is shown in FIGURE 2 and comprises a first layer 20 of a light transmitting, electrically conducting glass such as may be formed of tin oxide. The portion of the mirorr 11 behind the layer 20 is in the form of a plurality of cells isolated by insulating dividers 21 and 22. An electro-optic body, such as of potassium dideuterium phosphate (KD*P), partially fills each of the cells between dividers 21 and 22. The body 25 has one face confronting the rear surface of the layer 20. The opposite face of body 25 abuts a highly reflecting (preferably 100% reflecting) mirror 26 formed of material such as aluminum. A contact 27 on the rear surface of the mirror 26 is coupled by way of a control chanel 28 to a voltage source 29, the other terminal of which is connected to the conducting layer 20.

Means for controlling the voltage of voltage source 29 to the cell to change the optical properties of the body 25 is diagrammatically represented by the switch 30. The Z-axis of the body 25 preferably will lie in the plane of the paper as viewed in FIGURE 2 and will be oriented with the X-axis and Y-axis at 45° with respect to the laser polarization. By varying the voltage applied to the body 25, via the layer 20 and the mirror 26, the laser mode related thereto may be perturbed and eliminated, thus producing a discernible contrast in the pattern of the output of the laser as transmitted by lens 13 through the mirror 12.

It will be noted that a second body 31 and a mirror 32 positioned between insulating bars 22 and 23 are controlled by means of switch 33. Similarly, a third electro-optic body 35 and a mirror 36 are positioned between the insulating bars 23 and 24 and are controlled by switch 37.

With each body oriented as above noted, zero voltage applied across any one of elements then corresponds with maximum reflection from its associated mirror. Only small changes in reflectivity are needed to shut off the transverse modes associated with each reflecting element. Therefore only small voltages, of the order of 100 volts, will be needed for complete extinction of a given mode.

By forming the confining mirror as illustrated, the light enters each reflection element approximately normally. The small field of view associated with each of the elements thus does not inhibit its operation. As shown in FIGURE 3, the matrix of such elements is formed between the horizontal insulating grids 21–24 and the similar vertically insulating grids.

The dimensions of the electro-optic body 25, the mirror 26, and the companion elements determine the resolution possible in the display. For many purposes, mirrors 10 mils (0.01″) square will be adequate. The thickness radially of the elements 25 and 26, in general, is not critical. By way of example, the electro-optic material 25 may be of the order of 0.015 inch thick and the mirror 26 may be 0.005 inch thick.

The system shown in FIGURES 2 and 3 thus requires an electrical circuit leading to each of the elements, the connections being completed by way of the terminals, such as terminal 27, on the back of each mirror. In FIGURE 4, a modified form of matrix and control system is shown wherein a transmitting-conducting glass layer 50 is backed by a layer of an electro-optic material 51. A segmented mirror layer 52 is backed by a photoconductive layer 53. A voltage source 54 is connected between the front conducting layer 50 and the photoelectric layer 53. Layer 53 preferably has relatively low electrical resistance radially and high electrical resistance in the plane thereof.

In FIGURE 5, the electrical equivalent of the matrix of FIGURE 4 is shown with the battery 54 being connected in series with a resistor 53a and a resistor 51a. In the matrix of FIGURE 4, the operation of the layer 51 is controlled by varying the relative voltage drops across the resistive portions 53a and 51a. This is varied by use of a light beam, such as from a source 56, which projects a pencil of light 57 onto an area 58 of the photoconductive layer 53. The photoconductive layer 53 thus changes resistance, and a corresponding change occurs in the resistance 53a in the equivalent circuit of FIGURE 5. This results in a change in the voltage drop across the electro-optic layer 51, thus changing its optical character to attenuate a given mode of laser operation.

In high resolution systems it will be readily appreciated that the problem of completing connections to a confining mirror in the manner indicated in FIGURE 2 would be difficult because of the close packing of leads that would be necessary. FIGURES 6 and 7 illustrate a construction which may be employed wherein an integrated semiconductor circuit construction includes a matrix of electro-optic elements backed by mirror sections and adapted to be controlled by an XY pattern of control conductors.

More particularly, a silicon substrate 60 has a plurality of diodes, such as diodes 61–64, diffused in its upper surface in a regular pattern of rows and columns. Only one diode column is shown in FIGURE 7, with only one of the diodes, diode 61, being shown in the sectional view of FIGURE 6. The silicon substrate 60 is etched to form isolation channels 65, leaving a pattern of square islands as viewed from the surface. An insulating layer 70 is formed over the surface of substrate 60 and over the diodes 61–64. A contact to surface 60, such as the contact 71, is formed in each of the square surface areas by etching and evaporation. Electrodes 81–84, extending in the X-direction, are formed over the insulating layer 70. An insulating layer 79 is formed over the X-electrodes 81–84. Y-electrodes 75–77 are formed over the insulating layer 79. A reflector 86 also overlies a substantial portion of each island, having indentations 86a on each of the sides to avoid overlying the zones occupied by the diode on one side and a contact on the other side. An insulating layer 87 extends over the reflector 86 and over the Y-electrodes 75–77. An electro-optic material is located on the surface of the insulating layer 87. The layer is surface-etched down to the insulating layer 87, so that there remains an array of planar topped rectangular islands or pedestals, such as pedestal 90, FIGURE 5, having sloping sides 91 and 92, FIGURE 6. The sloping sides 91 and 92 are coated with conductive electrodes 93 and 94, respectively. The electrode 93 is in electrical contact with the Y-electrode 75. The electrode 94 extends through the insulating layers 87, 79, and 70 to contact the diode 61. By application of voltages to a selected pair of X and Y-electrodes, the polarization of light transmitted therethrough of a given pedestal may be controlled.

Input signal decoding is employed to select any one of the total number of matrix cells. In utilizing digital input signals, a decoding unit may be of the type currently employed for selection of elements in other arrays such as computer memory. The matrix may require two diodes forming a negative AND gate or a transistor at each intersection of X and Y grids, only one diode per intersection being shown.

FIGURE 8 illustrates a line at a time scan control for the matrix of FIGURES 6 and 7. A 24 kc. clock 100 is coupled to a ring counter 101 which serves to apply square wave gating pulses at the 24 kc. rate to the successive X-input channels 102a–102n. Thus, the driver channels extend in the X-direction or along the Y-axis. A corresponding member of latch circuits 103 are provided on the Y-channels, with the driver elements 104 connecting to the Y-leads. Read gates 105 are actuated at the 24 kc. rate. The latch circuits 103 are reset at the 24 kc. rate.

A shft register 106 receives input information and is actuated at a video frequency of, for example, 12 mc. Thus, the ring counter 101 scans the X-leads to produce a vertical scan. To drive the Y-leads, the shift register 106 is driven at the 12 mc. clock rate. To avoid the need for a second shift register, gate circuit 103 of the latching type is employed. Each time a line of new information is fed to the shift register 106 as at the rate of one line every 40 microseconds, a 24 kc. clock pulse dumps the information into the latching gate 103 which holds for the next 40 microseconds, while the Y-leads are driven. Just prior to dumping the shift register 106 again, the latched gates 103 are reset and the vertical scan ring counter 101 shifts to the next X-lead.

The embodiment illustrated in FIGURE 6 may be formed in connection with a silicon substrate or other materials. For example, germanium or gallium arsenide may be used. Further, the specific form of the logic elements may be varied depending upon the array and its requirements. For example, it may be desirable to provide an array in which alpha-numeric symbols only are to be formed in the laser output beam. In such case, it would be necessary only to provide for application of electric fields to a limited number of segments of the array. In such case, it may be more convenient to provide the access logic elements remote from the location of a given segment of the birefringent material. A limited number of leads could thus be employed extending from the localized areas to be actuated to perimetrical circuit components. In such case, a semiconductor substrate would not be required in the form illustrated in FIGURES 6 and 7. Rather, an insulating substrate would be provided with the necessary circuit leads thereon over which the birefringent material would be passed and interconnected. However, an integrating system of the type shown in FIGURES 6 and 7 would be preferable for many installations.

Operation of the invention is generally as follows. With reference, once again, to FIGURE 1, it is seen that polarized laser light passes twice through the electro-optic body 25 of mirror 11. When the voltage applied to the body is zero, there is no birefringence, and the electro-optic body acts as any ordinary transparent material. When a voltage is applied, the polarized light of the laser enters the crystal 25, and is separated into two equal components, polarized at 90° with respect to each other. One is a fast ray and the other is a slow ray. On emerging from the body 25, the two rays, since they traverse the body at different speeds, are out of phase by an amount depending upon the applied voltage. The rays then recombine to form elliptically polarized light. The resultant ellipticity of the beam produces a variable amplitude modulation of the beam.

To achieve useful modulation, materials for body 25 will be one of those whose large electro-optic coefficient allows the birefringence to be varied by application of an electric field. The magnitude of the electro-optic effect and its optimum application depends upon the crystallographic nature of the material and its atomic properties. While the nature of that dependence is to a great extent only empirically or qualitatively understood at the present time, it has been found that materials such as KD*P above noted, potassium dihydrogen phosphate (KDP), or a solid solution of potassium tantalate and potassium niobate (usually $KT_{0.65}N_{0.35}$) may be employed KD*P is currently available in usable quantities and quality, whereas KTN is available only in research quantities.

KD*P is a linear electro-optic material with a Curie temperature of −60° C. KTN is a quadratic material, whose Curie temperature can be varied with material stoichiometry. The value of the Curie temperature for the 65–35 mixture is about 20° C. KTN exhibits the highest known electro-optic effect at room temperature and will work as a light modulator at reasonable voltage levels.

The field-induced birefringence of KTN is given by $$n_e - n_o = \frac{n_o^3}{2}(g_{11} - g_{12})(\epsilon_o x E)^2$$

where:

$n_o$ is the unperturbed index or refraction of the cubic material;
$g_{11} - g_{12}$ is the appropriate quadratic electro-optic coefficient;
E is the applied field $V/d$; $d$ is the crystal thickness across which the voltage V is applied;
$\epsilon_o$ is the permittivity of free space; and
$x$ is the dielectric susceptibility.

The effective half-wave potential $V_{\lambda/2}$ for KTN, i.e., the minimum signal voltage required to change the linear polarization of the incoming light into an orthogonally polarized state (thus producing 100% modulation) is found from $$\frac{2\pi l}{\lambda_o} \Delta(n_e - n_o) = \pi x^{1/2}$$

where:

the factor of ½ is included because the light traverses the body 25 twice as illustrated in FIGURE 2;
$\lambda_o$ is free space optical wavelength of the ambient illumination; and
$l$ is the crystal thickness along the light path.

By substitution, $$V_{\lambda/2} = \sqrt{\frac{\lambda_o}{2n_o^3(g_{11}-g_{12})(\epsilon_o x)^2}} \frac{d}{\sqrt{l}}$$

where:

$d$ is the crystal dimension along the applied field direction.

Substituting $\lambda_0 = 6000$ A., $x = 10^4$, and $(g_{11} - g_{12}) = 0.174$ m.$^4$/coulomb$^2$ $$V_{\lambda/2} \cong 400 \frac{d}{\sqrt{l}}$$

for $d$ and $l$ in centimeters.

Control of a given mode may be accomplished by far less than 100% modulation. Thus, KTN would be suitable for formation of body 25.

The optimum operation will depend on the requirements, such as response time, element persistence, shades of gray required, applied voltage for $V_S$ and $V_B$, environmental temperature, and required insensitivity to ambient temperature fluctuations.

KTN is a ferro-electric material having a number of physical and chemical properties desirable for use herein. It is a perovskite, the parent compounds $KTaO_3$ and $KNbO_3$ forming a continuous series of solid solutions. The parent compounds are quite compatible because they have almost identical unit cell dimensions. The Curie temperature of a particular mixture can be varied over a wide range depending on the ratio of constituents.

Crystals of KTN have an electro-optic coefficient (expressed as a function of polarizability) which is comparable with other electro-optic materials. This gives rise to a large electro-optic effect at room temperature due to its large dielectric constant ($\epsilon \cong 10^4$) near the Curie temperature.

The crystal faces are parallel to the cubic faces of the lattice to within ±0.5 degree. The crystal is clear and colorless. With the unaided eye, no imperfection can be seen. The dielectric susceptibility, $x$, of a KTN crystal was measured from 10° C. to 45° C., indicating that susceptibility above 25° C. can be expressed as $$x = \frac{1.4 \times 10^5}{T - 14}$$

where the temperature, T, is in ° C. Below 25° C., susceptibility deviates from the ideal Curie-Wiess law. The behavior of the susceptibility indicates that this sample undergoes a second-order ferro-electric transition; i.e., the susceptibility is not discontinuous as is the first-order transition in other materials such as barium titanate.

Alternative constructions which might be used for the mirror surface in the laser cavity of the invention are described in the copending application by D. Eden, Ser. No. 529,845, filed Feb. 24, 1966, entitled Photoelectric Electro-Optic Transducer, and which is assigned to the assignee of the present application, and in copending application by W. R. Clendinning and D. Eden, Ser. No. 530,173, filed Feb. 24, 1966, entitled Ferro-Electric Passive Information Displays, and which also is assigned to the assignee of the present application.

Having described the invention in connection with certain specific embodiments thereof, it is to be understood that further modifications may now suggest themselves to those skilled in the art and it is intended to cover such modifications as fall within the scope of the appended claims.

What is claimed is:

1. Apparatus for forming images in a laser beam comprising:
   (a) a multiple mode laser;
   (b) a lens;
   (c) a source of electrical potential;
   (d) two reflective surfaces disposed to form a laser cavity, one at the objective position of said lens and the other at the image position of said lens, one of said two reflective surfaces comprising:
       (1) a substrate of semiconductor material with a plurality of channels cut therein to form electrically isolated rows and columns of islands on a surface thereof, (2) a plurality of diodes, one constructed in each island, (3) a first layer of electrically insulating material formed over said substrate and said diodes, said first layer of electrically insulating material having a hole cut therein over each island to expose a portion of said island, (4) a first plurality of electrodes formed over said first layer of electrically insulating material, each electrode contacting each island along a row of islands through said holes cut in said first layer of electrically conducting material, (5) a second layer of electrically insulating material formed over said first layer of electrically insulating material and said first plurality of electrodes, (6) a second plurality of electrodes formed over said second layer of electrically insulating material, each electrode corresponding in position to a column of islands, (7) a plurality of reflective elements, each positioned on said second layer of electrically insulating material over one of said islands, (8) a plurality of pedestals of an electro-optic material each pedestal having a conducting material formed on two of its sides and being positioned over one of said reflective elements such that the conducting material of one of the sides of said pedestal contacts one of said plurality of electrodes along a column of islands, and the conducting material of the other of said sides of said pedestal extends through said first and second electrically insulating layers to contact said diode such that when said sources of electrical potential is applied between an electrode extending along a row of said islands and an electrode extending along a column of said islands, a current will flow through the diode in the island at the intersection of said electrodes and through the electro-optic material to cause perturbations in light waves passing therethrough to modify the lasing mode, whereby images are formed in the output beam of the laser cavity corresponding to the pattern formed by the islands under the intersection of electrodes to which said source of electrical potential is applied.

2. The apparatus of claim 1 wherein said substrate is silicon.

3. The apparatus of claim 1 wherein said electro-optic material is a solid solution of potassium tantalate and potassium niobate.

4. The apparatus of claim 1 wherein said electro-optic material is potassium dideuterium phosphate.

References Cited

UNITED STATES PATENTS

| | | | |
|---|---|---|---|
| 2,892,380 | 6/59 | Baumann | 350—160 |
| 3,284,799 | 11/66 | Ross | 350—160 |
| 3,339,151 | 8/67 | Smith | 350—160 |

ROBERT L. GRIFFIN, *Primary Examiner.*

A. MAYER, *Assistant Examiner.*

U.S. Cl. X.R.

331—94.5; 350—160